(12) United States Patent
Hasebe et al.

(10) Patent No.: US 6,582,626 B2
(45) Date of Patent: Jun. 24, 2003

(54) POLYMERIZABLE COMPOUND, POLYMERIZABLE LIQUID CRYSTAL COMPOSITION CONTAINING THE SAME, AND OPTICALLY ANISOTROPIC MEDIUM MADE FROM THE COMPOSITION

(75) Inventors: Hiroshi Hasebe, Saitama (JP); Sadao Takehara, Chiba (JP); Kiyofumi Takeuchi, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 29 days.

(21) Appl. No.: 09/986,316

(22) Filed: Nov. 8, 2001

(65) Prior Publication Data

US 2002/0060310 A1 May 23, 2002

(30) Foreign Application Priority Data

Nov. 13, 2000 (JP) ........................................ 2000-345051

(51) Int. Cl.$^7$ .................. C09K 19/20; C09K 19/38; C07C 69/76
(52) U.S. Cl. .................. 252/299.64; 252/299.63; 560/79; 560/83; 560/95
(58) Field of Search .................. 428/1.1; 252/299.64, 252/299.63; 560/76, 83, 95

(56) References Cited

U.S. PATENT DOCUMENTS 5,800,733 A 9/1998 Kelly
5,863,457 A 1/1999 Hasebe et al.

FOREIGN PATENT DOCUMENTS

| DE | 196 49 056 A | 5/1998 |
| EP | 0 675 186 A | 10/1995 |
| EP | 0 755 918 A | 1/1997 |
| WO | WO 00 63154 A | 10/2000 |

*Primary Examiner*—Shean C. Wu
(74) *Attorney, Agent, or Firm*—Armstrong, Westerman & Hattori, LLP

(57) ABSTRACT

A polymerizable compound represented by formula (I):

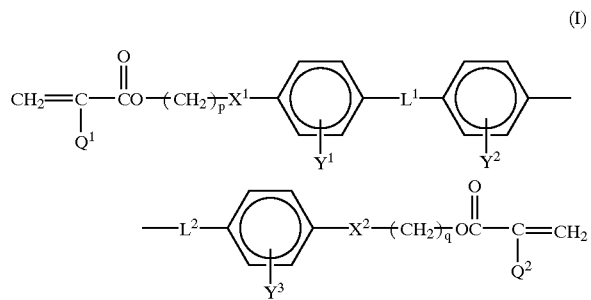

wherein $Q^1$ and $Q^2$ each independently represent a hydrogen atom or a methyl group; p and q each independently represent an integer of 2 to 18; $X^1$ and $X^2$ each independently represent a single bond, —O—, —COO— or —OCO—; $L^1$ represents —COO— or —OCO—; $L^2$ represents —$CH_2CH_2COO$— or —$CH_2CH_2OCO$—; and $Y^1$, $Y^2$ and $Y^3$ each independently represent a hydrogen atom, an alkyl group having 1 to 7 carbon atoms, an alkoxy group having 1 to 7 carbon atoms, an alkanoyl group having 2 to 7 carbon atoms, a cyano group or a halogen atom. Also disclosed are a polymerizable liquid crystal composition containing the compound, and an optically anisotropic medium produced from the composition.

4 Claims, No Drawings

POLYMERIZABLE COMPOUND, POLYMERIZABLE LIQUID CRYSTAL COMPOSITION CONTAINING THE SAME, AND OPTICALLY ANISOTROPIC MEDIUM MADE FROM THE COMPOSITION

FIELD OF THE INVENTION

This invention relates to a novel compound useful to make an optically anisotropic medium such as a wave plate and an optical low pass filter, a polymerizable liquid crystal composition comprising the compound, and an optically anisotropic medium obtained by polymerizing the composition.

BACKGROUND OF THE INVENTION

Optically anisotropic media having a fixed oriented structure can be produced by subjecting a polymerizable liquid crystal composition comprising a compound having a polymerizable functional group to orientation processing in its liquid crystal state and then polymerizing the oriented composition, while maintaining in its oriented state, by irradiation with active energy rays such as ultraviolet (UV) rays or electron beams. The optically anisotropic media thus produced show anisotropy in physical properties, such as refractive index, dielectric constant, magnetic susceptibility, elastic modulus, and thermal expansion coefficient, and are useful as a wave plate, a polarizer, a polarizing prism, a waveguide, etc.

JP-A-8-3111 (corresponding to U.S. Pat. No. 5,863,457) (The term "JP-A" as used herein means an "unexamined published Japanese patent application") discloses a polymerizable liquid crystal composition for these applications. The composition disclosed therein has a feature that it exhibits liquid crystalline properties at room temperature but has a drawback of insufficient transparency after polymerization.

JP-A-9-40585 (corresponding to U.S. Pat. No. 5,800,733) teaches that compounds having a folding molecular structure having long chains bonded to the 1- and 2-positions of a benzene ring, respectively, are effective in developing liquid crystalline properties at low temperature, and discloses, as an example, a compound having a —CH$_2$CH$_2$COO— bond represented by formula (I-d):

wherein s represents an integer of 3 to 12; $R^{34}$ represents a fluorine atom, a chlorine atom, a cyano group or an alkoxycarbonyl group; and $X^1$, $X^2$ and $X^3$ each represent a hydrogen atom.

Because of the two long chains introduced for facilitating development of liquid crystalline properties, these compounds have a high molecular weight and a very high viscosity. As a result, in case orientation defects such as disclination occur in orientation, it needs a lot of time to eliminate the defects, resulting in poor productivity.

SUMMARY OF THE INVENTION

Accordingly, an object of the present invention is to provide an optically anisotropic medium having excellent transparency with a small haze.

Another object of the invention is to provide a polymerizable compound useful for the production of the optically anisotropic medium.

A still other object of the invention is to provide a polymerizable liquid crystal composition comprising the polymerizable compound.

Other objects and effects of the invention will become apparent from the following description.

The above-described objects of the invention has been achieved by providing a novel polymerizable compound of a linear molecule in which three phenylene groups are linked via a 1,4-bond with one of the two linking groups that link the 1,4-phenylene groups being —CH$_2$CH$_2$COO— or —CH$_2$CH$_2$OCO—. The inventors found that the compound has a low under limit temperature of liquid crystalline phase owing to this structure and that a polymerizable liquid crystal composition containing the compound has a low under limit temperature of liquid crystalline phase as well. The inventors also found that an optically anisotropic medium obtained by subjecting the composition to orientation processing in its crystal state and then polymerizing the resulting composition with active energy ray irradiation while maintaining the oriented state has high transparency with a small haze.

That is, the present invention provides a polymerizable compound represented by formula (I):

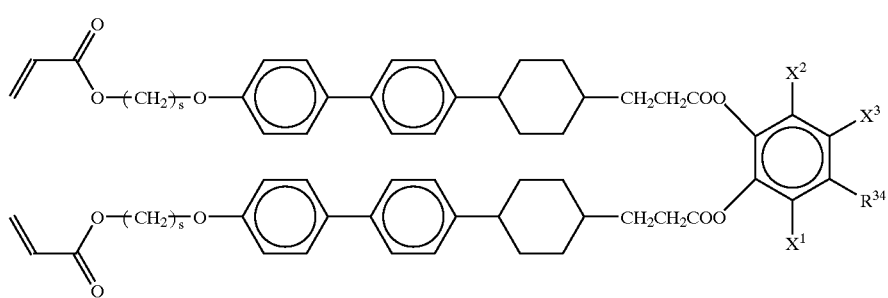

(I-d)

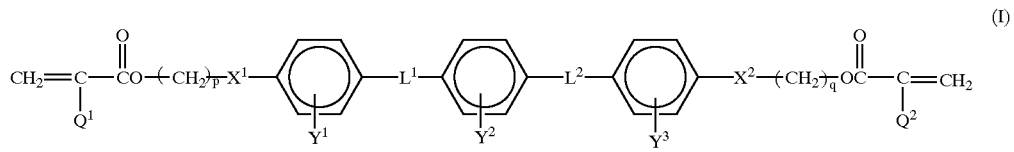

(I)

wherein $Q^1$ and $Q^2$ each independently represent a hydrogen atom or a methyl group; p and q each independently represent an integer of 2 to 18; $X^1$ and $X^2$ each independently represent a single bond, —O—, —COO— or —OCO—; $L^1$ represents —COO— or —OCO—; $L^2$ represents —CH$_2$CH$_2$COO— or —CH$_2$CH$_2$OCO—; and $Y^1$, $Y^2$ and $Y^3$ each independently represent a hydrogen atom, an alkyl group having 1 to 7 carbon atoms, an alkoxy group having 1 to 7 carbon atoms, an alkanoyl group having 2 to 7 carbon atoms, a cyano group or a halogen atom.

In addition, the present invention also provides a polymerizable liquid crystal composition for producing an optically anisotropic medium, which comprises:

a polymerizable compound represented by the above formula (I); and a compound represented by formula (II):

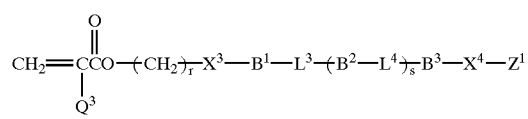

(II)

wherein $Q^3$ represents a hydrogen atom or a methyl group; $X^3$ represents a single bond or —O—; $X^4$ represents a single bond, —O—, —OCO—, —COO— or —CH═CH—COO—; $B^1$, $B^2$ and $B^3$ each independently represent a 1,4-phenylene group, a 1,4-phenylene group in which one CH group or not adjoining two CH groups thereof are displaced with a nitrogen atom, a 1,4-cyclohexylene group, a 1,4-cyclohexylene group in which one CH$_2$ group or not adjoining two CH$_2$ groups thereof are displaced with an oxygen atom or a sulfur atom, a 1,4-cyclohexenylene group, or a 1,4-cyclohexenylene group in which one CH$_2$ group or not adjoining two CH$_2$ groups thereof are displaced with an oxygen atom or a sulfur atom, and $B^1$, $B^2$ and $B^3$ each may have one or more substituents selected from an alkyl group having 1 to 7 carbon atoms, an alkoxy group having 1 to 7 carbon atoms, an alkanoyl group having 2 to 7 carbon atoms, a cyano group, and a halogen atom; $L^3$ and $L^4$ each independently represent a single bond, —CH$_2$CH$_2$—, —CH$_2$O—, —OCH$_2$—, —COO—, —OCO—, —C≡C—, —CH═CH—, —CF═CF—, —(CH$_2$)$_4$—, —CH$_2$CH$_2$CH$_2$O—, —OCH$_2$CH$_2$CH$_2$—, —CH═CH—CH$_2$CH$_2$—, —CH$_2$CH$_2$—CH═CH—, —CH═CH—COO— or —OCO—CH═CH—; $Z^1$ represents a hydrogen atom, a halogen atom, a cyano group, an alkyl group having 1 to 20 carbon atoms or an alkenyl group having 2 to 20 carbon atoms, wherein one or more CH$_2$ groups of the alkyl group or the alkenyl group may be displaced with —O—, —CO—, —COO—, —OCO— or —OCOO—, provided that the displacement does not make an O—O bond; r represents 0 or an integer of 1 to 18; and s represents 0 or 1.

Since the polymerizable liquid crystal composition contains the compound of formula (I), the under limit temperature of liquid crystalline phase thereof is low. Therefore, it is not necessary to excessively raise a temperature upon producing an optically anisotropic medium by orienting the polymerizable liquid crystal composition in its liquid crystal state and then polymerizing the same while maintaining the oriented state. This affords convenience in handling and suppresses an increase in haze, caused by thermal polymerization or oxidation due to heating, in the resulting optically anisotropic medium. Hence, an optically anisotropic medium having high transparency can be produced from the polymerizable liquid crystal composition of the invention.

DETAILED DESCRIPTION OF THE INVENTION

In formula (I), p and q are each preferably 3 to 12, particularly preferably 3 to 8. $X^1$ and $X^2$ are each preferably —O—. $Y^1$, $Y^2$ and $Y^3$ are each preferably a hydrogen atom, a fluorine atom, an alkyl group having 1 to 3 carbon atoms or an alkoxy group having 1 to 3 carbon atoms. Of the alkyl and alkoxy groups preferred are a methyl group and a methoxy group. A hydrogen atom and a fluorine atom are particularly preferred as $Y^1$, $Y^2$ and $Y^3$.

The compounds represented by formula (I) include those represented by formulae (1) through (12) shown blow, in which p and q each independently represent an integer of 2 to 18:

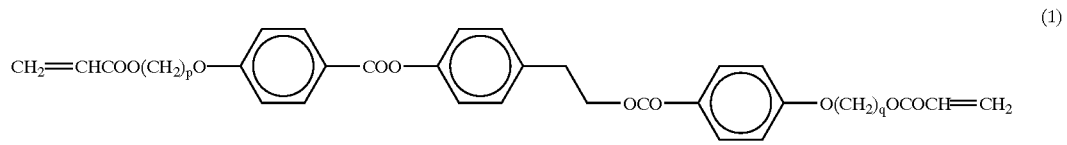

(1)

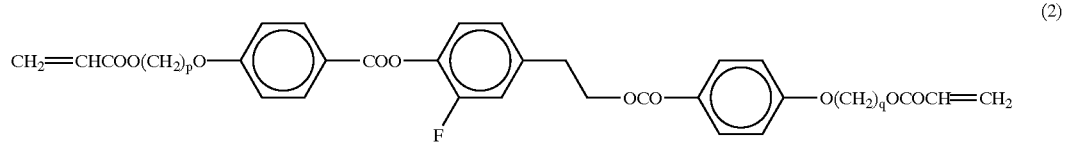

(2)

(3)
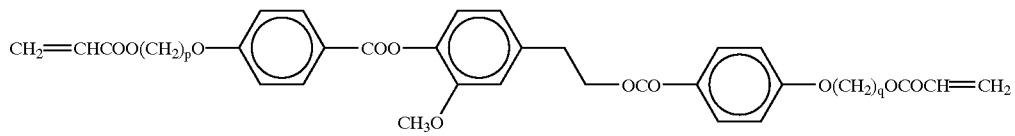
(4)
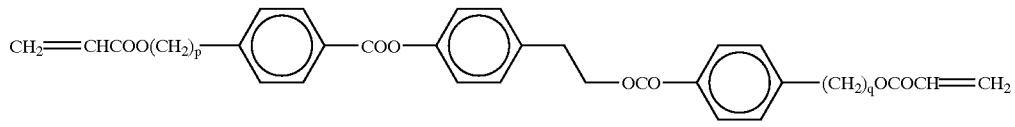
(5)
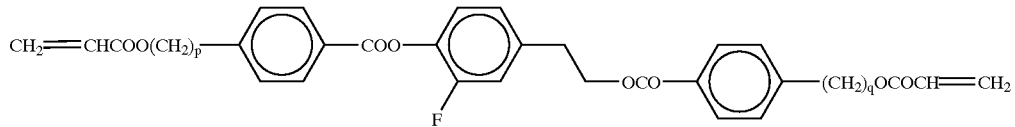
(6)
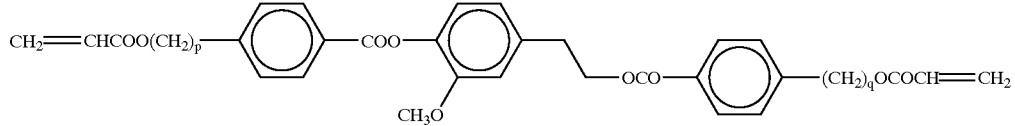
(7)
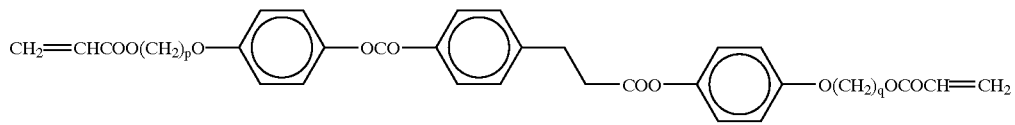
(8)
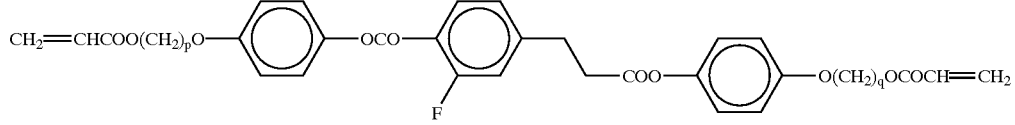
(9)
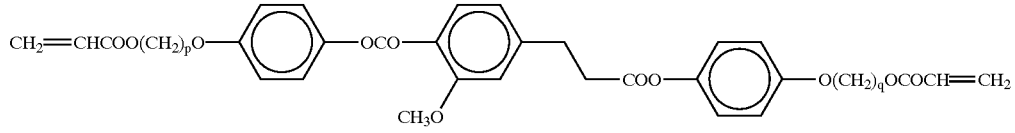
(10)
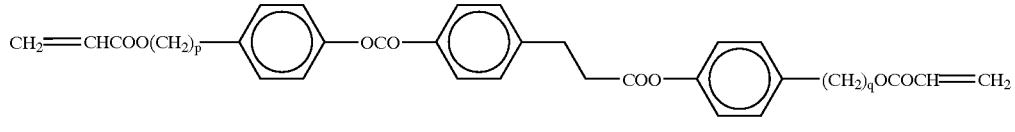
(11)
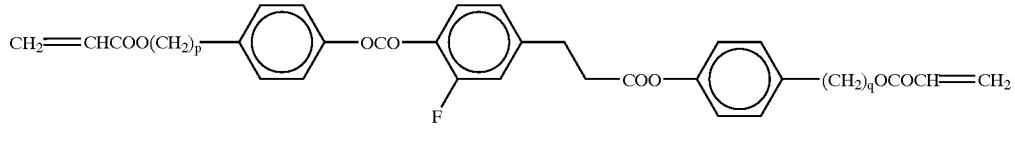
(12)
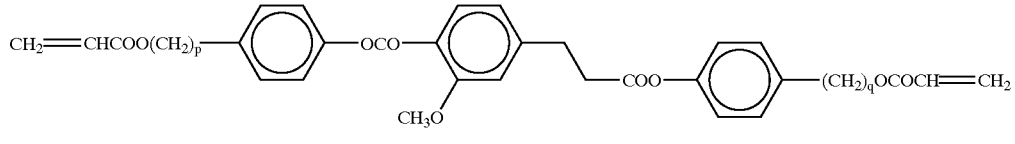

Of the above compounds preferred are those of formula (1) in which p and q are each independently an integer of 3 to 8.

An example of the synthesis method of the compound according to the present invention is shown below.

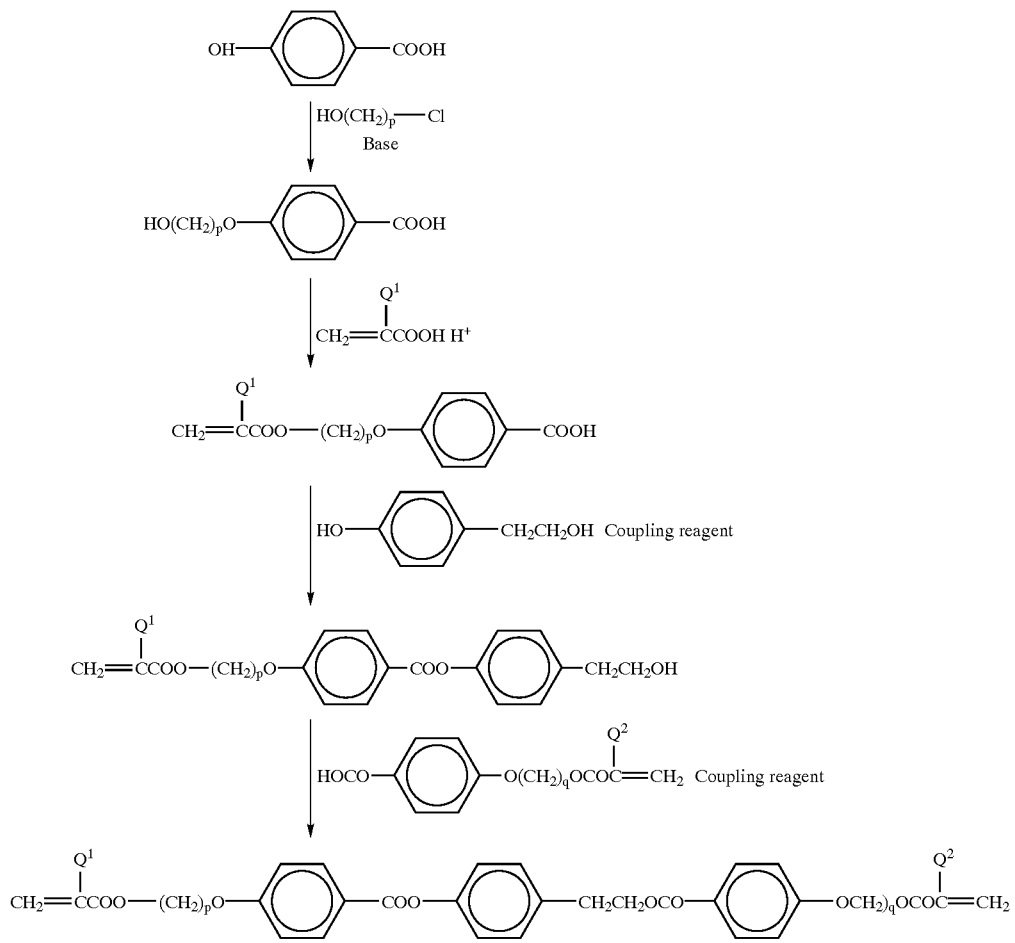

In the above formulae, p, q, $Q^1$ and $Q^2$ are as defined in formula (I).

The compound of the invention is structurally characterized in that rings are linked via a group represented by —$CH_2CH_2COO$— or —$CH_2CH_2OCO$—. Synthesis of the chemical structures other than this linking part can be performed by known processes established in the art of liquid crystal compounds in combination with the above-described processes.

The polymerizable liquid crystal composition according to the present invention comprises the compound of formula (I) and the compound of formula (II).

Of the compounds of formula (I) for use in the polymerizable liquid crystal composition, those represented by the following formula are preferred:

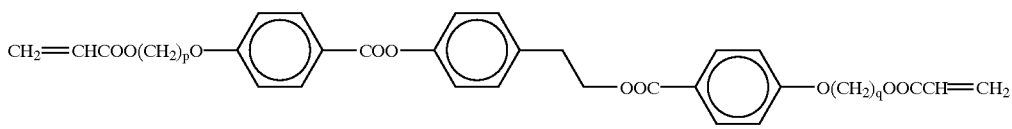

wherein p and q each independently represent 3 to 8.

The polymerizable liquid crystal composition preferably contains the compound of formula (I) in a proportion of 30% by weight or more, more preferably 50% by weight or more, particularly preferably 70% by weight or more.

Of the compounds of formula (II), preferred are those in which $X^3$ is a single bond, and r is 0, i.e., compounds represented by formula (II-1):

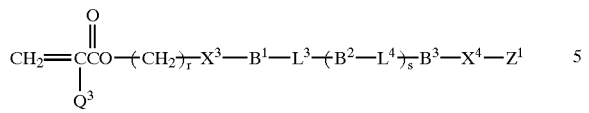
(II-1)

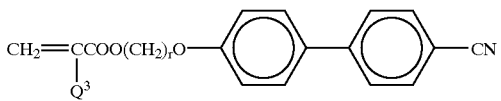
(a-1)

(wherein $Q^3$, $X^4$, $B^1$, $B^2$, $B^3$, $L^3$, $L^4$, $Z^1$ and s are as defined in formula (II), $X^3$ represents a single bond, and r represents 0); and those in which $X^3$ is —O—, and r is an integer of 1 to 18, i.e., compounds represented by formula (II-2):

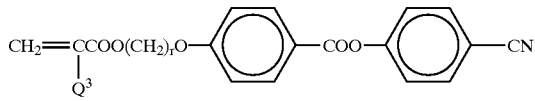
(a-2)

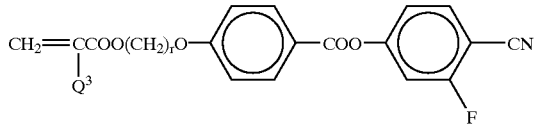
(a-3)

(II-2)

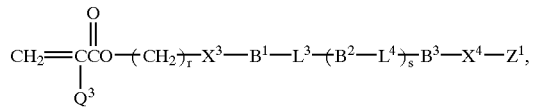

wherein $Q^3$, $X^4$, $B^1$, $B^2$, $B^3$, $L^3$, $L^4$, $Z^1$ and s are as defined in formula (I), $X^3$ represents —O—, and r represents an integer of 1 to 18.

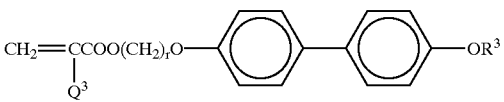
(a-4)

In formula (II-2), r is preferably 2 to 12, more preferably 2 to 8, particularly preferably 2 to 6. Of the compounds represented by formula (II-1), further preferred are those represented by formulae (III) and (IV):

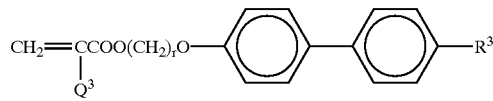
(a-5)

(III)

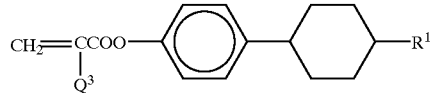

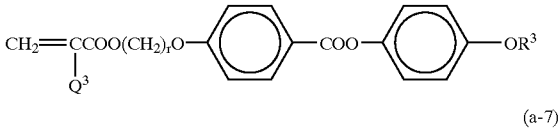
(a-6)

wherein $Q^3$ represents a hydrogen atom or a methyl group; and $R^1$ represents an alkyl group having 1 to 10 carbon atoms;

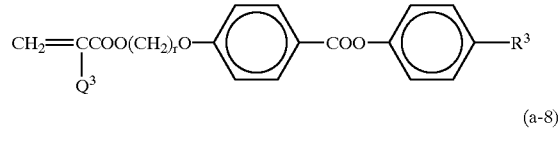
(a-7)

(IV)

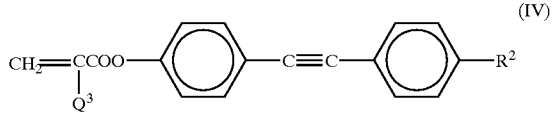

(a-8)

wherein $Q^3$ represents a hydrogen atom or a methyl group; and $R^2$ represents an alkyl group having 1 to 10 carbon atoms. The compound of formula (III) and the compound of formula (IV) can be used either singly or in combination. In other words, the polymerizable liquid crystal composition of the present invention preferably comprises the polymerizable compound of formula (1) and at least one of the compound of formula (III) and the compound of formula (IV). Where the compound of formula (III) and the compound of formula (IV) are used in combination, it is preferred that the proportions of these compounds be equal for decreasing the under limit temperature of liquid crystalline phase of the polymerizable liquid crystal composition.

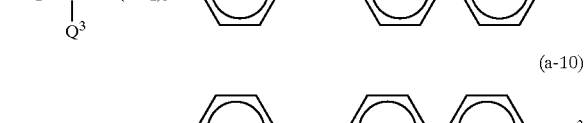
(a-9)

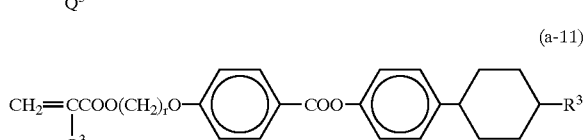
(a-10)

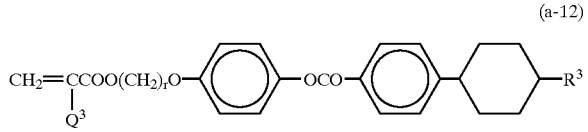
(a-11)

Specific examples of the compound of formula (II-2) include those represented by formulae (a-1) through (a-15) shown below, in which r and $Q^3$ are as defined in formula (II); and $R^3$ represents a hydrocarbon group having 1 to 20 carbon atoms:

(a-12)

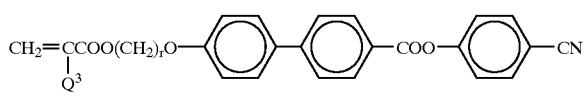

(a-13)

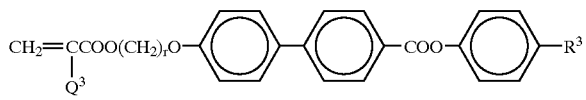

(a-14)

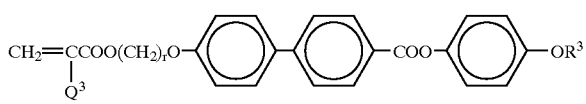

(a-15)

The proportion of the compound of formula (II) in the polymerizable liquid crystal composition is preferably 30 to 70% by weight, more preferably 30 to 50% by weight.

The polymerizable liquid crystal composition can further comprise known polymerizable liquid crystal compositions in addition to the compounds (I) and (II).

The liquid crystalline phase temperature range of the polymerizable liquid crystal composition according to the invention usually is from 20 to 80° C. The liquid crystalline phase is preferably a nematic phase which shows satisfactory alignment.

Since the liquid crystal composition of the invention keeps its liquid crystalline phase even in a low temperature, a high degree of orientation can be fixed in low temperatures in which thermal fluctuations are suppressed. As a result, satisfactory uniformity of orientation can be secured, which is highly advantageous for making optically anisotropic media having excellent transparency with a small haze. From this viewpoint, it is preferred that the composition of the invention be designed to have an under limit temperature of liquid crystalline phase of 40° C. or lower, especially around room temperature (i.e., 25° C.).

Next, the method for orienting the polymerizable liquid crystal composition of the invention is described below.

The polymerizable liquid crystal composition can be oriented by applying the composition to (1) a substrate having been rubbed with cloth, etc., (2) a substrate having an organic thin film formed thereon which has been rubbed with cloth, etc. or (3) a substrate having an $SiO_2$ layer formed by oblique vacuum deposition, or by filling the composition into a gap between a pair of these substrates.

The composition can be applied to a substrate by spin coating, die coating, extrusion coating, roll coating, wire bar coating, gravure coating, spray coating, dip coating, printing or a like coating method.

The orientation of the polymerizable liquid crystal composition can also be achieved by other methods used for liquid crystal materials such as flow-induced orientation, electric field orientation or magnetic field orientation. These means can be used either singly or as a combination of two of more thereof. Photo-induced orientation can be used instead of the rubbing technique.

A polyimide film, which is used in usual twisted nematic (TN) or supertwisted nematic (STN) devices, can be used to align the polymerizable liquid crystal composition at a tilt angle with respect to the substrate. Orientation processing using a polyimide film is preferred because the molecular orientation structures inside an optically anisotropic medium can be further precisely controlled. Where the alignment is controlled in an electric field, it is preferred to use a substrate having an electrode layer. A substrate having an organic thin film on the electrode layer is particularly preferred. The organic thin film is preferably a polyimide thin film.

The direction of orientation with respect to the substrate is of choice according to the intended use or desired functions of the article to be made.

A photopolymerization initiator is usually added to the polymerizable liquid crystal composition of the invention to improve the polymerization reactivity.

The polymerizable liquid crystal composition is polymerized by irradiation with active energy rays for securing rapid progress of polymerization. UV light is preferably used as active energy rays. Either a polarized light source or a non-polarized light source can be used. The intensity of UV rays is preferably 0.1 mW to 2 W/cm². With an intensity lower than 0.1 mW/cm², a very long time will be needed to complete photopolymerization, resulting in poor productivity. Light intensities higher than 2 W/cm² tend to deteriorate the liquid crystal composition.

The temperature at the time of the irradiation is preferably within a range in which the liquid crystal composition retains its liquid crystal state. The temperature is preferably as close as possible to room temperature, typically at 25° C., for avoiding induction of unintended thermal polymerization.

Next, the optically anisotropic medium of the present invention is described below.

The optically anisotropic media according to the present invention can be obtained by orienting the polymerizable liquid crystal composition in its liquid crystal state by the above-described methods and irradiating the composition with the above-described active energy rays to cause the composition to polymerize while retaining its oriented state.

An optically anisotropic medium that is used to widen the viewing angle of a liquid crystal display is obtained by orienting the molecules in the direction making 10 to 80°, preferably 20 to 70°, with the substrate or by making hybrid alignment.

An optically anisotropic medium that is used as a polarizer or an optical low pass filter is obtained by orienting the molecules in the direction making 30 to 60°, preferably 40 to 50°, still preferably 45°, with the substrate or by hybrid alignment.

In applications as a polarizer or an optical low pass filter, the film is often made thicker (50 μm or greater) than for use as a wave plate. The material being the same, a thicker film involves larger light scattering. Therefore, an optically anisotropic medium for making a practical optical device is required to cause little light scattering, i.e., to have a small haze. The polymerizable liquid crystal composition of the invention can provide an optically anisotropic medium having a reduced haze of 3% or less. In applications as a compensator to be integrated into a liquid crystal cell of a reflection type liquid crystal device, it is important to reduce a haze to increase transparency. This is particularly important for use as a quarter wave plate.

The optically anisotropic medium thus prepared can be used either as formed on the substrate or as stripped off the substrate used for alignment control. A plurality of the resulting optically anisotropic media can be used as stacked, or the medium can be adhered to another substrate.

The present invention will now be illustrated in greater detail with reference to the following Examples, but the invention should not be construed as being limited thereto. All the "parts" are given by weight unless otherwise indicated.

EXAMPLE 1

Synthesis of Polymerizable Compound-1

A mixture consisting of 138.1 g of 4-hydroxybenzoic acid, 136.1 g of 6-chloro-1-hexanol, 84.0 g of sodium hydroxide, 25.0 g of potassium iodide, 440 ml of ethanol, and 440 ml of water was heated at 80° C. for 32 hours while stirring. After cooling to room temperature, 1000 ml of a saturated aqueous solution of sodium chloride was added to the reaction mixture, and diluted hydrochloric acid was added thereto until the aqueous layer of the reaction mixture became weakly acidic. The reaction mixture was extracted with 1000 ml of ethyl acetate. The organic layer was washed with water, and the organic solvent was removed by evaporation under reduced pressure. The residue was air-dried to give 223.9 g of a compound represented by formula (s-1):

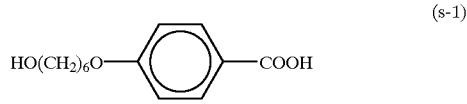

(s-1)

A mixture consisting of 110.0 g of compound (s-1), 133.1 g of acrylic acid, 27.0 g of p-toluenesulfonic acid, 6.0 g of hydroquinone, 420 ml of toluene, 180 ml of n-hexane, and 260 ml of tetrahydrofuran was heated with stirring under reflux for 6 hours while distilling off produced water. The reaction mixture was cooled to room temperature, and 1000 ml of a saturated aqueous sodium chloride solution and 800 ml of ethyl acetate were added thereto to conduct extraction. The organic layer was washed with water, and the organic solvents were evaporated under reduced pressure to give 231.4 g of a crude product, which was recrystallized twice each from a mixture of 400 ml of n-hexane and 100 ml of toluene to give 111.8 g of a compound represented by formula (s-2):

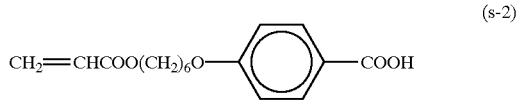

(s-2)

A mixture consisting of 10.6 g of compound (s-2), 4.0 g of 2-(4-hydroxyphenyl)ethyl alcohol, 0.5 g of 4-dimethylaminopyridine, 7.0 g of 1-[3-(dimethylamino)propyl]-3-ethylcarbodiimide hydrochloride, 0.5 g of 4-dimethylaminopyridine, and 150 ml of methylene chloride was stirred at room temperature for 20 minutes. To the reaction mixture was added a mixture consisting of 10.6 g of compound (s-2), 7.0 g of 1-[3-(dimethylamino)propyl]-3-ethylcarbodiimide hydrochloride, 0.5 g of 4-dimethylaminopyridine, and 50 ml of methylene chloride, followed by stirring at room temperature for 8 hours. After completion of the reaction, the reaction mixture was washed with water. The organic layer was evaporated under reduced pressure to give 24.5 g of a crude product. The crude product was purified by column chromatography on silica gel using ethyl acetate as a developing solvent (Rf=1.0) and recrystallization from 60 ml of ethanol and then from a mixed solvent of 60 ml of methanol and 25 ml of methylene chloride to yield 13.5 g of a polymerizable compound represented by formula (s-3):

When the polymerizable liquid crystal compound (s-3) was heated, it turned into a nematic phase at 61° C. (under limit of nematic phase: 61° C.) and to an isotropic liquid phase at 81° C.

EXAMPLE 2

Synthesis of Polymerizable Compound-2

A mixture consisting of 91.3 g of methyl 4-hydroxybenzoate, 68.1 g of 3-chloro-1-propanol, 99.0 g of potassium carbonate, and 360 ml of dimethylformamide was heat-refluxed at 80° C. while stirring for 16 hours. After cooling to room temperature, 800 ml of a saturated aqueous sodium chloride solution was added to the reaction mixture, and diluted hydrochloric acid was added thereto until the aqueous layer turned weakly acidic. The resulting reaction solution was extracted with 1000 ml of tetrahydrofuran, and the extract was evaporated under reduced pressure to remove the organic solvent to give 133.1 g of a crude product represented by formula (s-4):

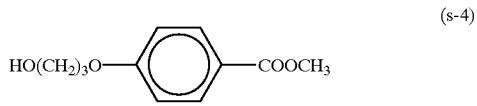

(s-4)

A mixture consisting of 133.1 g of the crude compound (s-4), 50.0 g of sodium hydroxide, 100 ml of methanol, and 100 ml of water was heated under reflux with stirring for 4 hours. The reaction mixture was cooled to room temperature and neutralized with hydrochloric acid. To the reaction mixture were added 1000 ml of a saturated aqueous solution of sodium chloride and then 1000 ml of tetrahydrofuran to carry out extraction. The organic solvents were evaporated off under reduced pressure to give 118.5 g of a crude product. Recrystallization from a mixed solvent of 200 ml of toluene and 100 ml of tetrahydrofuran afforded 88.0 g of a compound represented by formula (s-5):

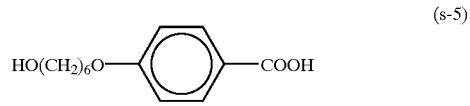

(s-5)

A mixture of 44.0 g of compound (s-5), 96.8 g of acrylic acid, 20.0 g of p-toluenesulfonic acid, 4.0 g of hydroquinone, 200 ml of toluene, 150 ml of hexane, and 150 ml of tetrahydrofuran was heated under reflux for 8 hours with stirring while removing produced water by means of a Dean-Stark apparatus. The reaction mixture was cooled to room temperature and washed with 1000 ml of a saturated aqueous solution of sodium chloride. To the organic layer was added 900 ml of ethyl acetate, and the organic layer was further washed with 300 ml of a saturated aqueous solution of sodium hydrogencarbonate twice. The organic layer was washed finally with three 1000 ml portions of water. The organic solvents were removed by evaporation under

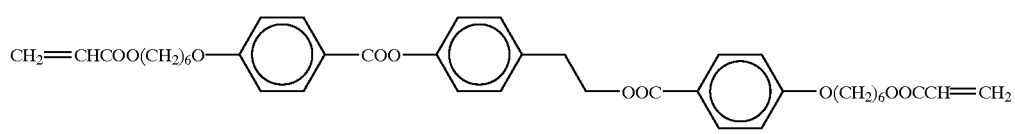

(s-3)

reduced pressure to give 54.2 g of a crude product. Recrystallization from a mixed solvent of 300 ml of toluene and 200 ml of hexane and then from a mixed solvent of 200 ml of toluene and 100 ml of hexane gave 45.3 g of a compound represented by formula (s-6):

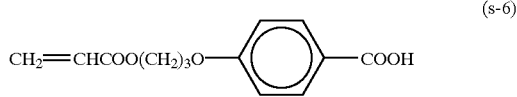

A mixture consisting of 12.3 g of compound (s-6), 3.2 g of 2-(4-hydroxyphenyl)ethyl alcohol, 0.6 g of 4-dimethylaminopyridine, 9.4 g of 1-[3-(dimethylamino) propyl]-3-ethylcarbodiimide hydrochloride, and 150 ml of tetrahydrofuran was stirred at room temperature for 6 hours. The reaction mixture was extracted with a mixed solvent of 200 ml of a saturated aqueous solution of sodium chloride and 400 ml of ethyl acetate. The organic layer was washed with water, and the organic solvent was removed by evaporation under reduced pressure to obtain 15.7 g of a crude product. The crude product was purified by column chromatography on silica gel using a mixed solvent of ethyl acetate and toluene (1:1 by volume; Rf=0.50) and recrystallization from 40 ml of methanol to yield 3.0 g of a polymerizable liquid crystal compound having formula (s-7):

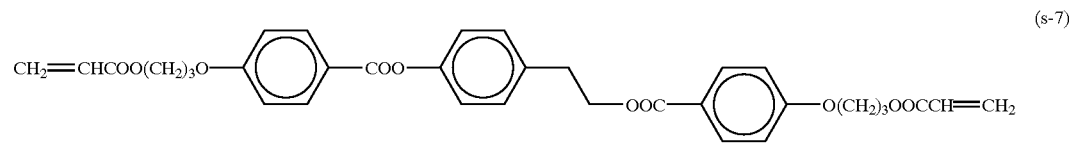

When the polymerizable liquid crystal compound (s-7) was heated, it changed into a nematic phase at 60° C. (under limit of nematic phase: 60° C.) and to an isotropic liquid phase at 84° C.

EXAMPLE 3

Preparation of Polymerizable Liquid Crystal Composition-1

Composition (A) was prepared from 50 parts of polymerizable liquid crystal compound (a-1):

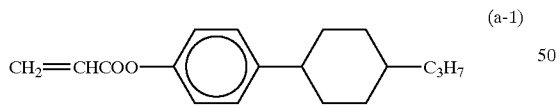

and 50 parts of polymerizable liquid crystal compound (a-4):

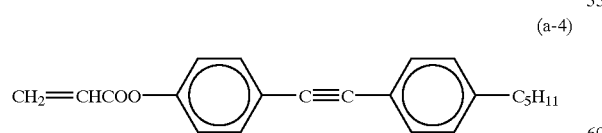

Composition (A) showed a nematic liquid crystalline phase at room temperature (25° C.) The nematic phase-isotropic liquid phase transition temperature was 46° C. Composition (A) had refractive indices $n_e$ (for extraordinary rays) and $n_O$ (for ordinary rays) of 1.662 and 1.510, respectively, at 589 nm, giving a birefringence of 0.152.

Composition (B) was prepared from 30 parts of the polymerizable liquid crystal compound (s-7) synthesized in Example 2 and 70 parts of composition (A). Composition (B) showed a nematic phase at room temperature and had a nematic-isotropic liquid transition temperature of 56° C. No crystals were precipitated for more than 3 hours.

EXAMPLE 4

Preparation of Polymerizable Liquid Crystal Composition-2

Composition (C) was prepared from 40 parts of the polymerizable liquid crystal compound (s-7) synthesized in Example 2 and 60 parts of composition (A). Composition (C) showed a nematic phase at room temperature and had a nematic-isotropic liquid transition temperature of 60° C. No crystals were precipitated for more than 1 hour.

EXAMPLE 5

Preparation of Polymerizable Liquid Crystal Composition-3

Composition (D) was prepared from 50 parts of the polymerizable liquid crystal compound (s-7) synthesized in Example 2 and 50 parts of composition (A). Composition (D) showed a nematic phase at room temperature and had a nematic-isotropic liquid transition temperature of 64° C. No crystals were precipitated for more than 1 hour.

EXAMPLE 6

Preparation of Polymerizable Liquid Crystal Composition-4

Composition (E) was prepared from 60 parts of the polymerizable liquid crystal compound (s-7) synthesized in Example 2 and 40 parts of composition (A). Composition (E) showed a nematic phase at room temperature and had a nematic-isotropic liquid transition temperature of 67° C. No crystals were precipitated for more than 30 minutes.

EXAMPLE 7

Preparation of Polymerizable Liquid Crystal Composition-5

Composition (F) was prepared from 70 parts of the polymerizable liquid crystal compound (s-7) synthesized in Example 2 and 30 parts of composition (A). Composition (F) showed a nematic phase at room temperature and had a nematic-isotropic liquid transition temperature of 71° C. No crystals were precipitated for more than 30 minutes.

EXAMPLE 8

Preparation of Polymerizable Liquid Crystal Composition-6

Composition (G) was prepared from 20 parts of the polymerizable liquid crystal compound (s-3) synthesized in Example 1 and 80 parts of composition (A). Composition (G) showed a nematic phase at room temperature and had a nematic-isotropic liquid transition temperature of 56° C. No crystals were precipitated for more than 48 hours. The refractive indices $n_e$ (for extraordinary rays) and $n_O$ (for ordinary rays) of composition (G) measured at 589 nm were 1.671 and 1.507, respectively, giving a birefringence of 0.164. The viscosity at 20° C. was 56.3 mPa·s.

EXAMPLE 9

Preparation of Polymerizable Liquid Crystal Composition-7

Composition (H) was prepared from 40 parts of the polymerizable liquid crystal compound (s-3) synthesized in Example 1 and 60 parts of composition (A). Composition (H) showed a nematic phase at room temperature and had a nematic-isotropic liquid transition temperature of 62° C. No crystals were precipitated for more than 1 hour. The refractive indices $n_e$ and $n_O$ of composition (H) measured at 589 nm were 1.675 and 1.504, respectively, giving a birefringence of 0.171.

EXAMPLE 10

Preparation of Polymerizable Liquid Crystal Composition-8

Composition (I) was prepared from 60 parts of the polymerizable liquid crystal compound (s-3) synthesized in Example 1 and 40 parts of composition (A). Composition (I) showed a nematic phase at room temperature and had a nematic-isotropic liquid transition temperature of 68° C. No crystals were precipitated for more than 30 minutes.

EXAMPLE 11

Preparation of Polymerizable Liquid Crystal Composition-9

Polymerizable liquid crystal composition (J) was prepared from 99 parts of the polymerizable liquid crystal composition (D) prepared in Example 5 and 1 part of a photopolymerization initiator (Irgacure 651, available from Ciba Specialties Chemicals). Composition (J) showed a nematic phase at room temperature and had a nematic-isotropic liquid transition temperature of 62° C. No crystals were precipitated for more than 1 hour.

EXAMPLE 12

Preparation of Polymerizable Liquid Crystal Composition-10

Polymerizable liquid crystal composition (k) was prepared from 99 parts of the polymerizable liquid crystal composition (E) prepared in Example 6 and 1 part of a photopolymerization initiator Irgacure 651. Composition (K) showed a nematic phase at room temperature and had a nematic-isotropic liquid transition temperature of 65° C. No crystals were precipitated for more than 30 minutes.

EXAMPLE 13

Preparation of Polymerizable Liquid Crystal Composition-11

The polymerizable liquid crystal compound (s-3) obtained in Example 1 and the polymerizable liquid crystal compound (s-7) obtained in Example 2 were mixed at a varied ratio. They exhibited good compatibility at any mixing ratio. A composition made up of 50 parts of compound (s-3) and 50 parts of compound (s-7) showed a nematic phase at room temperature and underwent no precipitation for more than 30 minutes.

Comparative Example 1

Preparation of Polymerizable Liquid Crystal Composition

Composition (L) was prepared from 20 parts of a compound having formula (s-8):

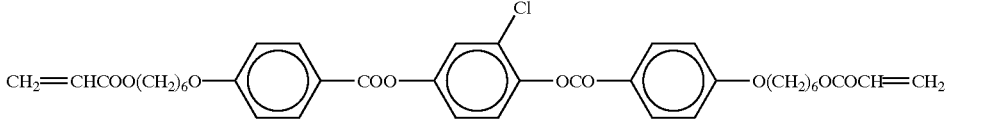

(s-8)

and 80 parts of composition (A). The compound (s-8) showed a crystal phase at room temperature and had a crystal-smectic phase transition temperature of 87° C., a smectic-nematic phase transition temperature of 91° C., and a nematic-isotropic liquid phase transition temperature of 110° C.

Composition (L) showed a nematic liquid crystalline phase at room temperature (25° C.) and had a nematic-isotropic liquid phase transition temperature of 64° C. Composition (L) began to precipitate crystals within 15 minutes.

Composition (M) was prepared from 99 parts of the composition (L) and 1 part of a photopolymerization initiator Irgacure 651. This composition showed a nematic phase at room temperature, had a nematic-isotropic liquid phase transition temperature of 60° C., and began to precipitate within 15 minutes.

Examples 3 to 13 in comparison with Comparative Example 1 prove that the polymerizable liquid crystal compositions comprising the compound of formula (I) and the polymerizable liquid crystal compositions comprising the compound of formula (I) and the compound of formula (II) have a low under limit temperature of liquid crystalline phase and hardly precipitate into crystals.

EXAMPLE 14

Preparation of Optically Anisotropic Medium-1

Composition (J) prepared in Example 11 was filled into a glass cell for antiparallel alignment (a cell for uniaxial alignment of liquid crystals) having a gap of 50 μm at room temperature. After the completion thereof, uniform uniaxial alignment was confirmed. The composition in the cell was irradiated with UV rays of 1 mW/cm² for 10 minutes by use of an ultraviolet lamp UVGL-25, supplied by Ultraviolet Inc., at room temperature (25° C.), whereupon the composition (J) polymerized to make an optically anisotropic medium. The resulting medium had different refractive indices according to the direction of incident light, verifying the functionality as an optically anisotropic material. The optically anisotropic medium as in the glass cell had a haze of 1.8%. The optically anisotropic medium taken apart from the glass cell was subjected to a heat resistance test. It was confirmed that the orientation is not disturbed even at 150° C.

EXAMPLE 15

Preparation of Optically Anisotropic Medium-2

Composition (K) prepared in Example 12 was filled into a glass cell for antiparallel alignment having a gap of 50 μm at room temperature. After the completion thereof, it was confirmed that uniform uniaxial alignment was created rapidly. The composition in the cell was irradiated with UV rays of 1 mW/cm² for 10 minutes by use of UVGL-25 at room temperature (25° C.), whereupon the composition (K) polymerized to make an optically anisotropic medium. The resulting medium had different refractive indices according to the direction of incident light, verifying the functionality as an optically anisotropic material. The optically anisotropic medium as in the glass cell had a haze of 1.7%. The optically anisotropic medium taken apart from the glass cell was subjected to a heat resistance test. It was confirmed that the orientation is not disturbed even at 150° C.

Comparative Example 2

Preparation of Optically Anisotropic Medium

Composition (M) prepared in Comparative Example 1 was filled into a glass cell for antiparallel alignment having a gap of 50 μm at room temperature. After the completion thereof, uniform uniaxial alignment was confirmed. The composition in the cell was irradiated with UV rays of 1 mW/cm² for 10 minutes by use of UVGL-25 at room temperature (25° C.), whereupon the composition (M) polymerized to make an optically anisotropic medium. The resulting medium had different refractive indices according to the direction of incident light, verifying the functionality as an optically anisotropic material. However, the optically anisotropic medium as in the glass cell had a haze of 13.5%, indicating poor transparency.

It is seen from Examples 14 and 15 and Comparative Example 2 that the optically anisotropic media prepared from the polymerizable liquid crystal compositions of the present invention have a small haze and exhibit high transparency.

The polymerizable liquid crystal compositions comprising the polymerizable compound of formula (I) of the invention and the compound of formula (II) have a low under limit temperature of liquid crystalline phase and hardly precipitate. Optically anisotropic media obtained by orienting the polymerizable liquid crystal composition of the invention and polymerizing while maintaining the oriented state have a small haze and excellent transparency. Therefore, the polymerizable compound of the invention and the polymerizable liquid crystal composition comprising the same are useful for the production of optically anisotropic media, such as wave plates and optical low pass filters.

While the invention has been described in detail and with reference to specific examples thereof, it will be apparent to one skilled in the art that various changes and modifications can be made therein without departing from the spirit and scope thereof.

What is claimed is:

1. A polymerizable compound represented by formula (I):

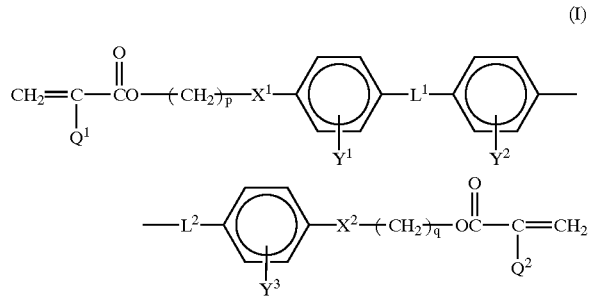

(I)

wherein $Q^1$ and $Q^2$ each independently represent a hydrogen atom or a methyl group; p and q each independently represent an integer of 2 to 18;

$X^1$ and $X^2$ each independently represent a single bond, —O—, —COO— or —OCO—;

$L^1$ represents —COO— or —OCO—;

$L^2$ represents —CH$_2$CH$_2$COO— or —CH$_2$CH$_2$OCO—; and $Y^1$, $Y^2$ and $Y^3$ each independently represent a hydrogen atom, an alkyl group having 1 to 7 carbon atoms, an alkoxy group having 1 to 7 carbon atoms, an alkanoyl group having 2 to 7 carbon atoms, a cyano group or a halogen atom.

2. A polymerizable liquid crystal composition for producing an optically anisotropic medium, which comprises:

a polymerizable compound represented by formula (I):

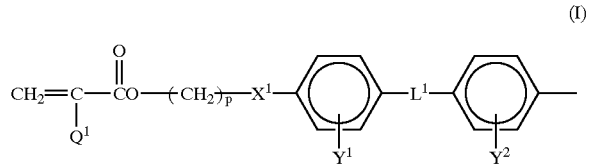

(I)

-continued

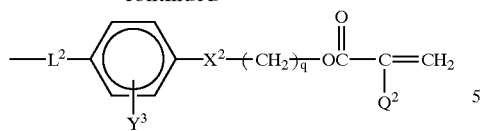

wherein $Q^1$ and $Q^2$ each independently represent a hydrogen atom or a methyl group;

p and q each independently represent an integer of 2 to 18;

$X^1$ and $X^2$ each independently represent a single bond, —O—, —COO— or —OCO—;

$L^1$ represents —COO— or —OCO—; $L^2$ represents —CH$_2$CH$_2$COO— or —CH$_2$CH$_2$OCO—; and $Y^1$, $Y^2$ and $Y^3$ each independently represent a hydrogen atom, an alkyl group having 1 to 7 carbon atoms, an alkoxy group having 1 to 7 carbon atoms, an alkanoyl group having 2 to 7 carbon atoms, a cyano group or a halogen atom; and a compound represented by formula (II):

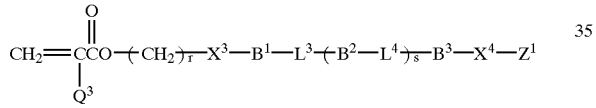
(II)

wherein $Q^3$ represents a hydrogen atom or a methyl group; $X^3$ represents a single bond or —O—;

$X^4$ represents a single bond, —O—, —OCO—, —COO— or —CH=CH—COO—;

$B^1$, $B^2$ and $B^3$ each independently represent a 1,4-phenylene group, a 1,4-phenylene group in which one CH group or not adjoining two CH groups thereof are displaced with a nitrogen atom, a 1,4-cyclohexylene group, a 1,4-cyclohexylene group in which one CH$_2$ group or not adjoining two CH$_2$ groups thereof are displaced with an oxygen atom or a sulfur atom, a 1,4-cyclohexenylene group, or a 1,4-cyclohexenylene group in which one CH$_2$ group or not adjoining two CH$_2$ groups thereof are displaced with an oxygen atom or a sulfur atom, and $B^1$, $B^2$ and $B^3$ each may have one or more substituents selected from an alkyl group having 1 to 7 carbon atoms, an alkoxy group having 1 to 7 carbon atoms, an alkanoyl group having 2 to 7 carbon atoms, a cyano group, and a halogen atom;

$L^3$ and $L^4$ each independently represent a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CH—CH$_2$CH$_2$—, —CH$_2$CH$_2$—CH=CH—, —CH=CH—COO— or —OCO—CH=CH—;

$Z^1$ represents a hydrogen atom, a halogen atom, a cyano group, an alkyl group having 1 to 20 carbon atoms or an alkenyl group having 2 to 20 carbon atoms, wherein one or more CH$_2$ groups of the alkyl group or the alkenyl group may be displaced with —O—, —CO—, —COO—, —OCO— or —OCOO—, provided that the displacement does not make an O—O bond;

r represents 0 or an integer of 1 to 18; and s represents 0 or 1.

3. The polymerizable liquid crystal composition according to claim 2, wherein said compound represented by formula (I) is a compound represented by the following formula:

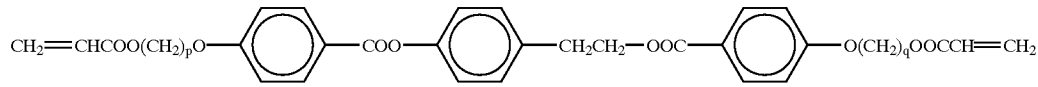

wherein p and q each independently represent an integer of 3 to 8, and wherein said compound represented by formula (II) is a compound represented by formula (III):

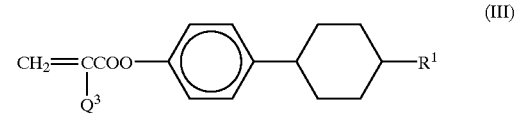
(III)

wherein $Q^3$ represents a hydrogen atom or a methyl group; and $R^1$ represents an alkyl group having 1 to 10 carbon atoms, or a compound represented by formula (IV):

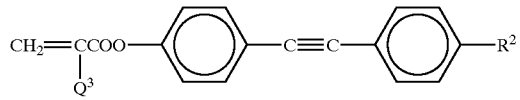
(IV)

wherein $Q^3$ represents a hydrogen atom or a methyl group; and $R^2$ represents an alkyl group having 1 to 10 carbon atoms.

4. An optically anisotropic medium obtained by orienting a polymerizable liquid crystal composition according to claim 2 in its liquid crystal state and polymerizing the oriented composition with active energy ray irradiation while maintaining the oriented state.

* * * * *